(12) United States Patent
So

(10) Patent No.: US 9,591,718 B2
(45) Date of Patent: Mar. 7, 2017

(54) ILLUMINANCE CONFIGURING ILLUMINATION SYSTEM AND METHOD USING THE SAME

(71) Applicant: Yu-Sheng So, New Taipei (TW)

(72) Inventor: Yu-Sheng So, New Taipei (TW)

( * ) Notice: Subject to any disclaimer, the term of this patent is extended or adjusted under 35 U.S.C. 154(b) by 0 days.

(21) Appl. No.: 14/686,504

(22) Filed: Apr. 14, 2015

(65) Prior Publication Data

US 2015/0296593 A1   Oct. 15, 2015

(30) Foreign Application Priority Data

Apr. 15, 2014   (TW) .............................. 103113633 A

(51) Int. Cl.
*H05B 37/02*   (2006.01)

(52) U.S. Cl.
CPC ..... *H05B 37/0218* (2013.01); *H05B 37/0227* (2013.01)

(58) Field of Classification Search
None
See application file for complete search history.

(56) References Cited

U.S. PATENT DOCUMENTS

| | | | | |
|---|---|---|---|---|
| 5,898,477 A * | 4/1999 | Yoshimura | .......... | G03F 7/70058 355/53 |
| 6,002,467 A * | 12/1999 | Nishi | .................. | G03F 7/70058 355/61 |
| 6,447,148 B1 * | 9/2002 | Oikawa | ............... | F21S 48/1376 359/867 |
| 6,456,377 B1 * | 9/2002 | Suzuki | ................ | G03F 7/70066 356/399 |
| 6,657,725 B1 * | 12/2003 | Takahashi | ................ | G01J 1/42 356/400 |
| 8,593,073 B2 * | 11/2013 | Aldrich | .............. | H05B 37/0218 315/291 |
| 8,717,432 B2 * | 5/2014 | Otani | ..................... | G01C 11/12 348/103 |
| 8,901,825 B2 * | 12/2014 | Reed | .................. | H05B 37/0245 315/149 |
| 9,185,777 B2 * | 11/2015 | Reed | ................... | H05B 37/0218 |
| 2003/0025890 A1 * | 2/2003 | Nishinaga | .............. | G03B 27/42 355/53 |
| 2006/0139659 A1 * | 6/2006 | Steinberg | .................. | F21S 2/00 356/614 |
| 2010/0271802 A1 * | 10/2010 | Recker | ............... | H05B 33/0803 362/20 |

(Continued)

*Primary Examiner* — Crystal L Hammond
(74) *Attorney, Agent, or Firm* — Alan D. Kamrath; Kamrath IP Lawfirm, P.A.

(57) ABSTRACT

An illuminance configuring illumination system for performing light adjustment in accordance with a determined illuminance range includes: at least one light assembly; a control module, provided with a set of preset light distribution curve data; a distance measuring module, configured to correspondingly measure a light distance of the light assembly, thereby obtaining a light adjustment reference information; and an illuminance measuring module, configured to detect the illuminance environmental variation in the surrounding of the light assembly, thereby obtaining a compensation reference information. The control module performs illuminance adjustment on the light assembly by referring to the set of preset illuminance range according to the light adjustment reference information and the compensation reference information.

16 Claims, 5 Drawing Sheets

(56) References Cited

U.S. PATENT DOCUMENTS

| | | | | |
|---|---|---|---|---|
| 2012/0001841 A1* | 1/2012 | Gokingco | ............... | G01J 1/32 345/102 |
| 2012/0019165 A1* | 1/2012 | Igaki | ............... | G08C 17/02 315/294 |
| 2012/0206050 A1* | 8/2012 | Spero | ............... | B60Q 1/04 315/152 |
| 2012/0242232 A1* | 9/2012 | Yata | ............... | G09G 3/3406 315/158 |
| 2013/0009552 A1* | 1/2013 | Page | ............... | H05B 37/0218 315/152 |
| 2013/0135876 A1* | 5/2013 | Phillips, III | ............... | F21V 5/04 362/335 |
| 2013/0194565 A1* | 8/2013 | Sorensen | ............... | G01N 21/55 356/73 |
| 2013/0250554 A1* | 9/2013 | Noguchi | ............... | F21S 4/003 362/147 |
| 2013/0265570 A1* | 10/2013 | Enami | ............... | G01J 1/4257 356/121 |
| 2014/0028216 A1* | 1/2014 | Wang | ............... | H05B 37/0245 315/294 |
| 2014/0078735 A1* | 3/2014 | Premysler | ............... | F21K 9/135 362/237 |
| 2014/0160755 A1* | 6/2014 | Dureiko | ............... | F21V 5/08 362/240 |
| 2014/0239808 A1* | 8/2014 | Nava | ............... | H05B 37/0218 315/82 |
| 2014/0292208 A1* | 10/2014 | Chemel | ............... | H05B 33/0854 315/154 |
| 2014/0297227 A1* | 10/2014 | Barnard | ............... | G01J 1/42 702/189 |
| 2014/0312779 A1* | 10/2014 | Vissenberg | ............... | H05B 33/0851 315/152 |
| 2014/0320028 A1* | 10/2014 | Zhuang | ............... | H05B 37/0227 315/159 |
| 2015/0029717 A1* | 1/2015 | Shen | ............... | F21V 5/005 362/235 |
| 2015/0102734 A1* | 4/2015 | Asami | ............... | H05B 37/0272 315/154 |
| 2015/0241274 A1* | 8/2015 | Barnard | ............... | G01J 1/4228 250/208.2 |
| 2015/0316232 A1* | 11/2015 | Di Trapani | ............... | F21V 9/02 362/611 |

* cited by examiner

ILLUMINANCE CONFIGURING ILLUMINATION SYSTEM AND METHOD USING THE SAME

FIELD OF THE INVENTION

The present invention relates to an illumination adjusting system and, particularly, to an illuminance configuring illumination system and method.

BACKGROUND OF THE INVENTION

Illumination refers to the technique of using all kinds of light sources to illuminate certain environments and locations. The development of illumination extends the work and rest time of modem people. The illuminating light in the darkness broadens the human horizon and also breaks the barrier between day and night. The utilization of illumination has to be based on the users' standpoint, namely, the use of illumination is user-oriented. Under this premise, eyesight protection is taken as a top priority when using light, because health is the foundation of all human accomplishments. The second priority is the quality of illumination, that is to say, to provide a good environment of illumination. The last priority is to conserve energy, increasing luminaire efficiency and saving a considerable sum of electricity consumption.

To achieve the goal of eyesight protection, "illuminance" is a top issue. Illuminance refers to "the brightness of an illuminated object". In order to provide an environment for eyes to comfortably recognize an object, provision of enough illuminance is necessary. In addition to providing appropriate illuminance, the light should also be distributed evenly to avoid a strong light contrast which leads to tired eyes.

For the time being, although there is a minor number of illumination devices equipped with a brightness adjusting function, the output illuminance is often insufficient or excessive, causing negative effects on eye health. The reasons are that the users do not know the exact illuminance value and can only adjust the brightness out of instinct, and that the conventional illumination system cannot adjust the illuminance precisely according to the users' adjustment.

SUMMARY OF THE INVENTION

Therefore, one of the objects of the present invention is to provide an illuminance configuring illumination system and method which can accurately adjust light according to a determined illuminance range.

To solve the technical problems in the prior art, the technical means adopted by the present invention provides an illuminance configuring illumination system for adjusting light from at least one light assembly in accordance with a determined illuminance range, comprising: the light assembly; a control module provided with a set of preset light distribution curve data which is a set of luminous intensity distribution data in relation to a light distribution direction and a light distance of the light assembly; a distance measuring module configured to correspondingly measure a light distance from the light assembly to a reference object, which is located in a preset light distribution direction, illuminated by the light assembly, thereby obtaining an illuminance adjusting reference information; and an illuminance measuring module configured to detect an environmental illuminance variation existing in the surrounding of the light assembly, thereby obtaining a compensation reference information. The control module performs illuminance adjustment on the light assembly based on the set of light distribution curve data by referring to the illuminance range, the illuminance adjustment reference information and the compensation reference information.

According to one embodiment of the present invention, the illuminance measuring module comprises a light detector configured to correspondingly detect the environmental illuminance variation in a non-light-distribution direction of the light assembly.

According to one embodiment of the present invention, the illuminance measuring module comprises a plurality of light detectors configured to correspondingly detect the environmental illuminance variations existing in a plurality of directions including a non-light-distribution direction and a light distribution direction.

According to one embodiment of the present invention, the illuminance configuring illumination system further comprises a setting module coupled with the control module for a user to configure the illuminance range.

According to one embodiment of the present invention, the setting module includes a power switch coupled with the control module through an alternating current power circuit.

According to one embodiment of the present invention, the illuminance measuring module includes a light sensor element and a light collector element disposed corresponding to the light sensor element. The light sensor element is provided to correspondingly detect the environmental illuminance variation existing in the surrounding of the light assembly through the light detector.

The present invention also provides an illuminance configuring illumination method for adjusting light from at least one light assembly in accordance with a determined illuminance range, comprising: (a) establishing a set of light distribution curve data which is a set of luminous intensity distribution data in relation to a light distribution direction of the light assembly and a light distance of the light assembly; (b) measuring a light distance from the light assembly to a reference object, which is located in a preset light distribution direction, illuminated by the light assembly, with an illuminance adjusting reference information being obtained; (c) detecting the environmental illuminance variation existing in the surrounding of the light assembly, with a compensation reference information being obtained; and (d) performing illuminance adjustment on the light assembly based on the set of light distribution curve data by referring to the configured illuminance range, the illuminance adjustment reference information and the compensation reference information.

According to one embodiment of the present invention, in step (c), the detection, which detects the environmental illuminance variation existing in the surrounding of the light assembly, is performed within a preset short time period during which the light assembly is turned off and after which the light assembly is turned on.

According to one embodiment of the present invention, in step (d), the illuminance adjustment is performed by compensating and adjusting the illuminance on the light assembly when there exists any alteration in connection to the determined illuminance range, the illuminance adjustment reference information, and the compensation reference information, or when there exists any alteration that exceeds a preset range of alteration.

According to one embodiment of the present invention, in step (d), the illuminance adjustment is performed by gradually adjusting illuminance on the light assembly according to the extent of the alteration.

According to one embodiment of the present invention, it further comprises a step of configuring an illuminance range before step (d).

According to one embodiment of the present invention, in steps (b) and (c), the measurement of the light distance and/or the detection of the environmental illuminance variation for all the light assemblies are performed synchronously by following the same alternating current power cycle of a common alternating current circuit.

According to one embodiment of the present invention, the step of configuring the illuminance range is synchronously performed by following the same alternating current power cycle of a common alternating current circuit.

According to one embodiment of the present invention, in step (c), the environmental illuminance includes the environmental illuminance under the condition that the light assembly is turned on, and in step (d), the illuminance adjustment is performed on a selected light assembly which is the corresponding light assembly that, when the corresponding light assembly is turned on, the illuminance of the environmental illuminance fails to fall within the configured illuminance range.

By the technical means of the present invention, the present invention can accurately adjust the illuminance of light to a determined or selected illuminance value without utilizing specialized detecting meters, realizing convenient and accurate light adjustment. Furthermore, an alteration in the position of the light assembly is followed by a modification performed by the present invention, which can also perform illumination compensation according to the variations in the environmental illuminance, maintaining accuracy of illuminance, and providing convenient use and setting of light assembly. Consequently, the present invention can provide good illumination quality and a comfortable illumination environment, and thus achieve the effect of eyesight protection.

The present invention is further explained by the embodiments and the appended drawings below.

DETAILED DESCRIPTION OF THE PREFERRED EMBODIMENTS

Figure 1:
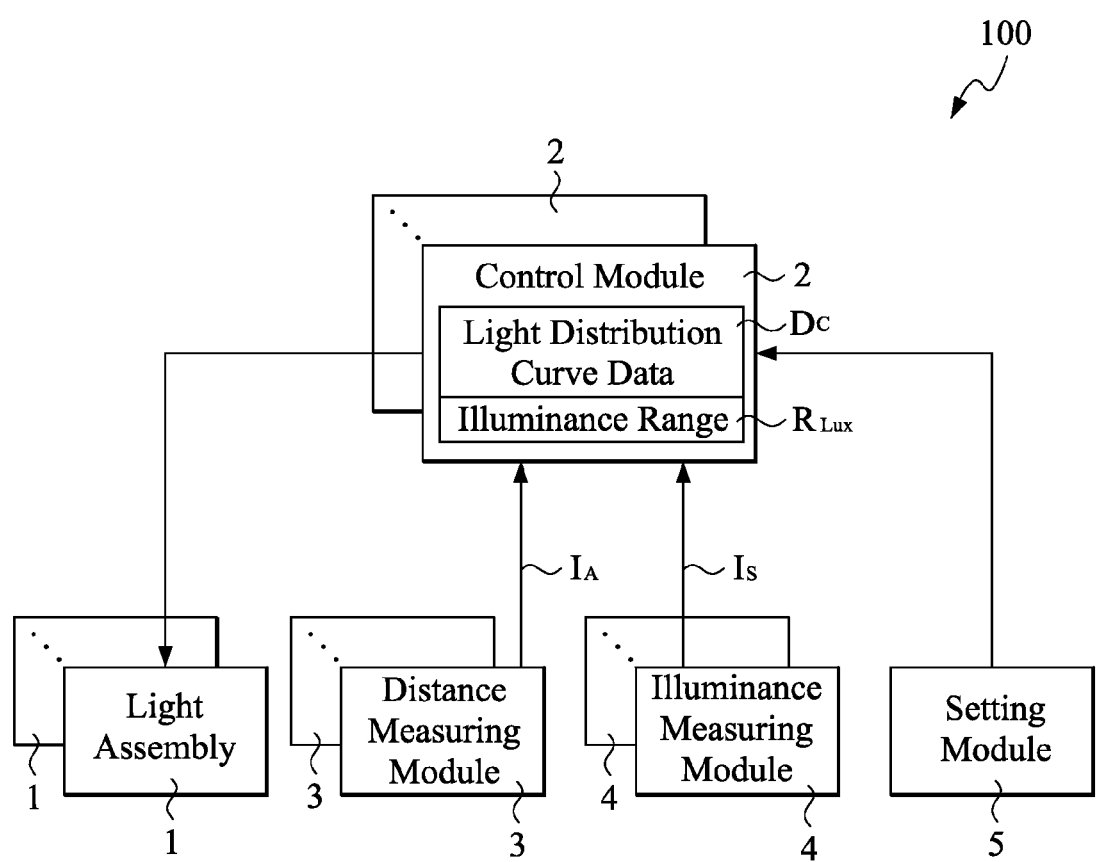
FIG. 1 is a block diagram of an illuminance configuring illumination system according to one embodiment of the present invention.

The embodiments of the present invention are described below with reference to FIG. 1 to FIG. 4c. The description is one of the embodiments of the present invention, and is not intended to limit the way of the embodiment of the present invention.

An illuminance configuring illumination system 100 according to one embodiment of the present invention is used for adjusting light from at least one light assembly 1 in accordance with a determined illuminance range $R_{Lux}$. The illumination system 100 comprises: the light assembly 1; a control module 2, provided with a set of preset light distribution curve data $D_C$ which is a set of luminous intensity distribution data in relation to a light distribution direction and a light distance of the light assembly 1; a distance measuring module 3, configured to correspondingly measure a light distance from the light assembly 1 to a reference object O, which is located in a preset light distribution direction, illuminated by the light assembly, thereby obtaining an illuminance adjusting reference information $I_A$; and an illuminance measuring module 4, configured to detect an environmental illuminance variation existing in the surroundings of the light assembly 1, thereby obtaining a compensation reference information $I_S$.

More specifically, the light assembly 1 can include one or a plurality of light sources, with each light source being a light emitting diode (LED), a fluorescent lamp or other type of light source. An LED light source can regulate illuminance more easily compared to a conventional light source, so it is suitable for being used in the light assembly 1 of the present invention. Besides, the present invention does not limit the type of the light assembly 1, which can be a ceiling lamp, a desk lamp, a street lamp, an embedded lamp, a board lamp, a projector lamp, a bulb, a parabolic aluminized reflector (PAR) lamp, a light bar, a tube lamp, etc., as shown in FIG. 4a to FIG. 4c.

Figure 3:
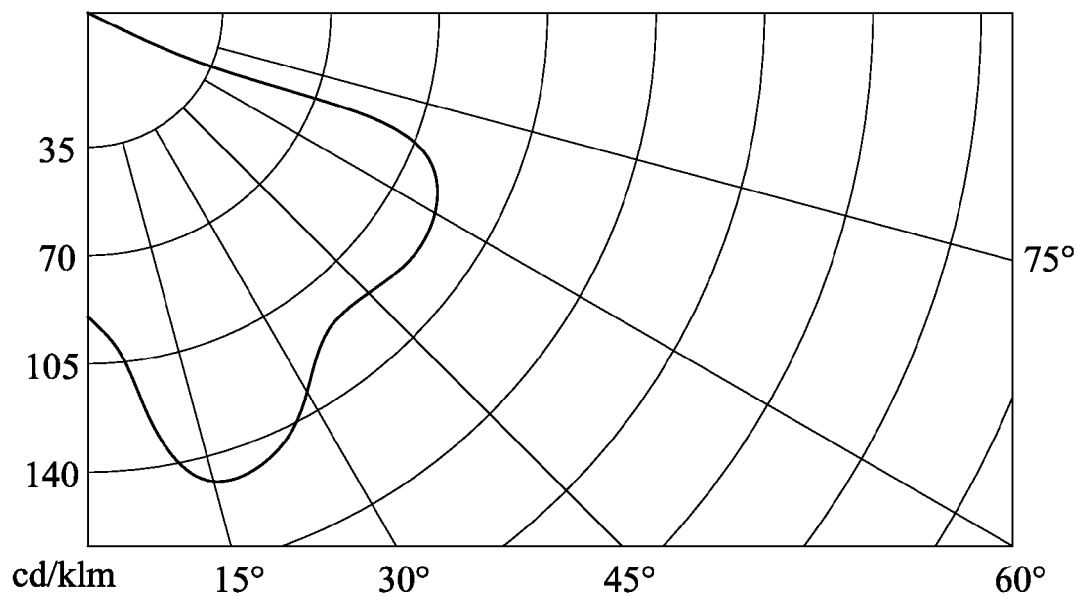
FIG. 3 is a schematic diagram illustrating a set of light distribution curve data.

As shown in FIG. 1, the control module 2 is coupled with the light assembly 1, the distance measuring module 3 and the illuminance measuring module 4, acting as a control center. The set of light distribution curve data provided in the control module 2 is used for indicating that the curve representing the illuminance value distribution in each projecting direction from the light assembly 1 will differ depending upon different types of light source in the light assembly 1, and different ways of configuring the light assembly 1. The set of preset light distribution data $D_C$ can be shown in a polar diagram, a Cartesian coordinate diagram, or a luminous intensity curve diagram. FIG. 3 shows an example of a set of preset light distribution curve data $D_C$ being represented in a polar diagram, wherein the angular coordinate represents the light direction (degree, °), and the radial coordinate represents luminous intensity (candela/kilo-lumen, cd/klm).

In this embodiment, the distance measuring module 3 is an infrared distance measuring sensor 31, but the distance measuring module 3 can also utilize other techniques to perform a distance measurement, such as a supersonic, laser, or mechanical measurement. The infrared distance measuring sensor 31 measures distance by emitting infrared light and receiving the reflected infrared light. As shown in FIG. 4a to FIG. 4c, the distance measuring module 3 is preferably disposed on the light assembly 1 (either on the inner side or outer side of the light assembly 1) and moves along with the light assembly 1, thus obtaining the latest and correct illuminance adjustment reference information $I_A$ according to a light distance. The light distance is a distance that the measuring module can detect after the position of the light assembly 1 is changed, and the light distance is a distance from the light assembly 1 in a new position to the reference object O. The reference object O can be selected arbitrarily according to the usage condition of the light assembly. For example, if the light assembly 1 is used as a street lamp, then the road surface can be chosen as the reference object O. If the light assembly 1 is used as a desk lamp, then the desk surface can be chosen as the reference object O. If the light assembly 1 is used as a ceiling lamp, then the floor, the desk surface, the wall surface, or the bed surface can be chosen as the reference object O.

Figure 4A:
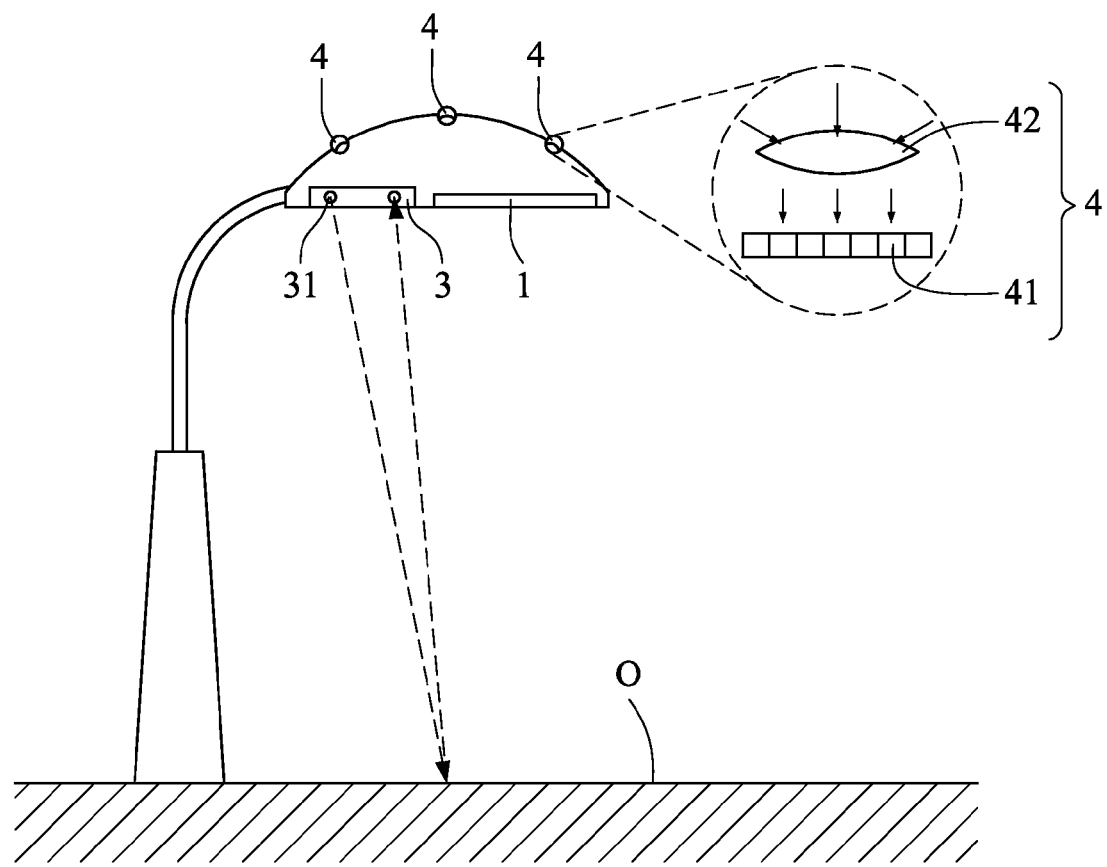
FIG. 4a to FIG. 4c are schematic diagrams illustrating the illuminance configuring illumination system according to the embodiment of the present invention.
Figure 4B:
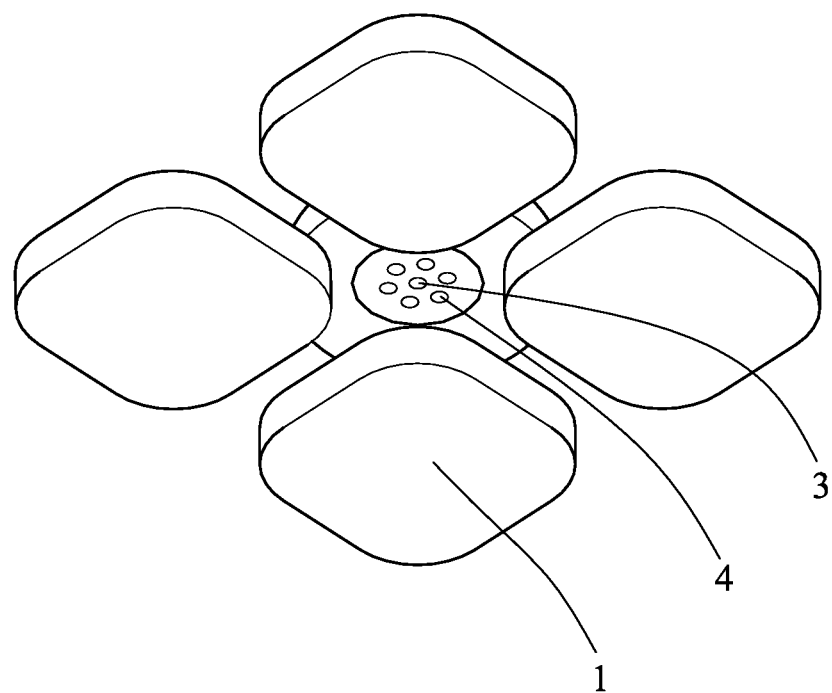
Figure 4C:
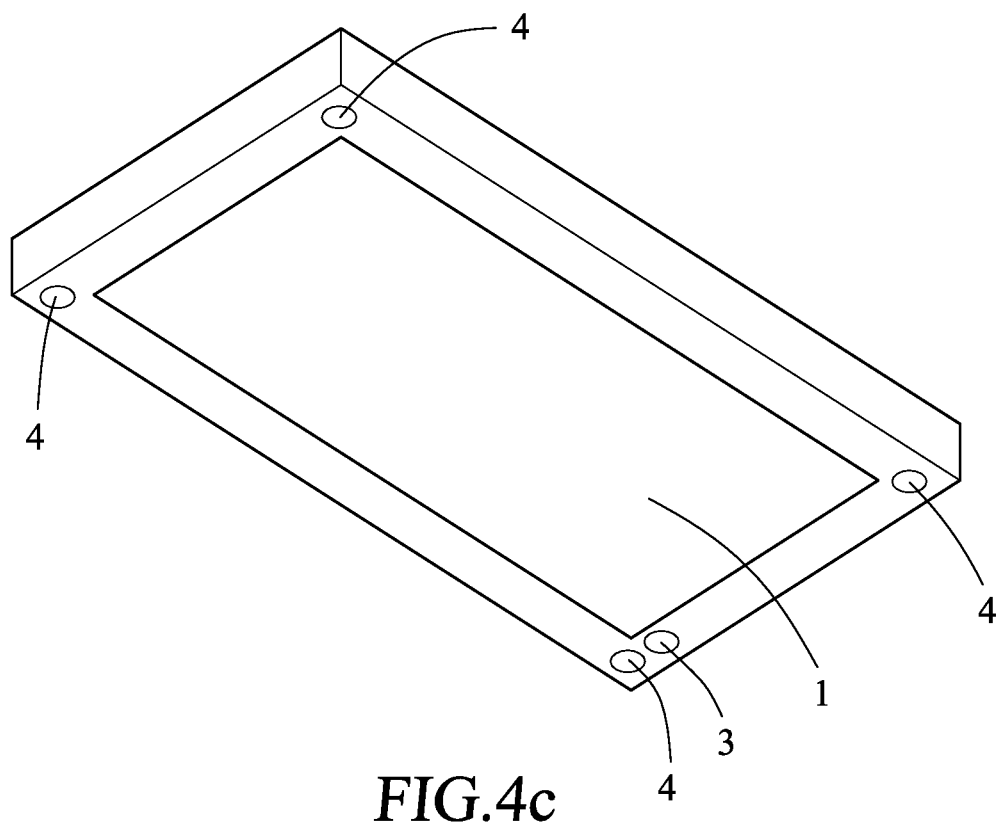

As shown in FIG. 4a to FIG. 4c, the illuminance measuring module 4 can preferably include a plurality of light detectors, configured to correspondingly detect the environmental illuminance variation in a non-light-distribution direction of the light assembly 1, and obtain an average value of environmental illuminance in the plurality of non-light-distribution directions for use. The non-light-distribution direction is, for example, at the back side or an outer side of the light assembly 1. Namely, the non-light-distribution direction refers to a direction that light does not directly reach when the light assembly 1 is turned on. Via the light detector configured to correspond to the light distribution direction, the environmental illuminance variation without a light output of the light assembly 1 can be directly detected.

Figure 5:
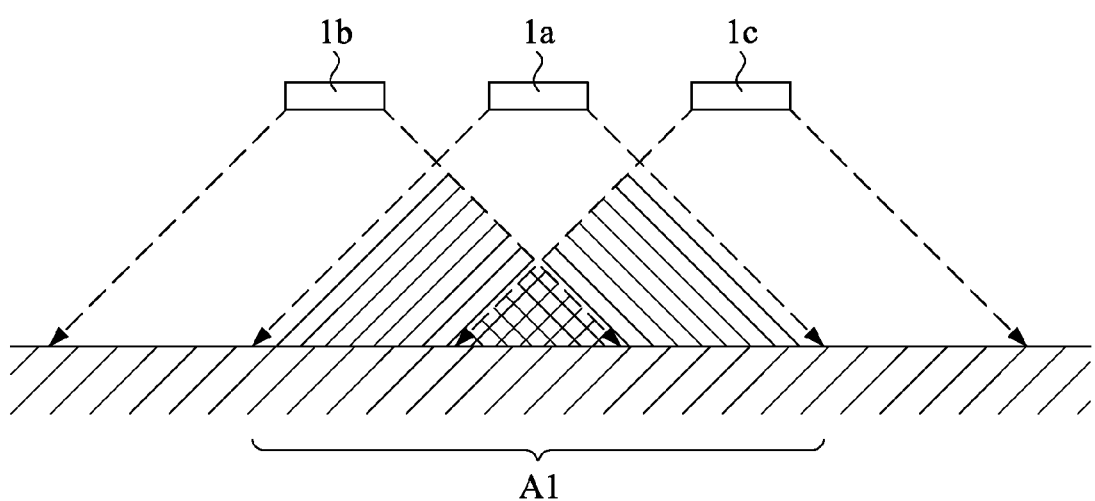
FIG. 5 is a schematic diagram illustrating an illumination region of a plurality of light assemblies.

Part or all of the light detector can further be configured to correspondingly detect the environmental illuminance variation in the light distribution direction of the light assembly 1. Via the light detector configured to correspond to the light distribution direction, the environmental illuminance variation including a light output of the light assembly 1 (for example, a total illuminance value) can be detected, which is displayed for notifying the users of the current illuminance value, and is provided for further determination and regulation performed by the control module 2. For instance, as shown in FIG. 5, under the circumstances that there are three light assemblies 1a, 1b and 1c, the middle light assembly 1a will be interfered by the surrounding light assemblies 1b and 1c, and the illuminance in the illuminated region A1 corresponding to the light assembly 1a will be affected in a way that the whole environmental illuminance fails to fall within the determined illuminance range. Therefore, according to a detected environmental illuminance including the light output of the light assembly 1a itself and the surrounding light assembly assemblies 1b and 1c, the light assembly 1a responsible for the illuminated region A1 can further perform illuminance adjustment while the other two light assembly assemblies 1b and 1c do not perform illuminance adjustment, by which the illuminance in the illuminated region A1 fall within the determined illuminance range. The light assembly 1a can perform the illuminance adjustment by a wide margin, to make the illuminance of the entire illumination environment fall within the determined illuminance range in a short period of time.

On the other hand, the light detector configured to correspond to the light distribution direction can be used to the environmental illuminance variation without the light output of the light assembly 1. When being applied to practical use, the detection of the environmental illuminance variation in the surroundings of the light assembly 1 is performed within a short time period, during which the light assembly 1 is turned off and after which the light assembly is turned on. The short time period is preferably a time period that cannot be perceived by human eye. Thereby the detection can be completed without disturbing the users, and obtaining of environmental illuminance is accurate.

The light detector can be configured on the back side of the light assembly 1 (as shown in FIG. 4a), amidst the light assembly 1 (as shown in FIG. 4b), at the corner of the light assembly 1 (as shown in FIG. 4c), etc.

As shown in FIG. 4a, the illuminance measuring module 4 includes a light sensor element 41 and a light collector element 42 disposed corresponding to the light sensor element 41. The light sensor element 41 is provided to correspondingly detect the environmental illuminance variation existing in the surroundings of the light assembly through the light collector element 42. Thus, the detection sensitivity is increased. The light sensor element 41 can be a charge-coupled device (CCD), a light sensor, a position sensitive detector (PSD), etc. The light collector element 42 can be a converging lens, a condensing lens, etc., to collect a larger range of environmental illuminance for the light sensor element 41 to detect.

On the other hand, as shown in FIG. 1, the illuminance configuring illumination system 100 of this embodiment further comprises a setting module 5, coupled with the control module 2 for a user to configure the illuminance range $R_{Lux}$. The setting module 5 includes a switch power (which is not shown in the drawings), coupled with the control module 2 via a alternating current power circuit, configuring the illuminance range $R_{Lux}$ via operating the power switch. For instance, by the operation of switching the power switch, produces switching signal for the control module 2 is produced, and the illuminance range $R_{Lux}$ is configured. Alternately, the setting module 5 includes a remote controller (which is not shown in the drawings), which is a remote signal receiving controller connected to the setting module 5 by mutually sending and receiving signal, by which the setting module 5 configures the illuminance range $R_{Lux}$. Besides, the setting module 5 can also be used to switch between an automatic and manual illuminance adjustment function or between other functions. The act of switching is, for example, the same action as switching a power switch.

Figure 2:
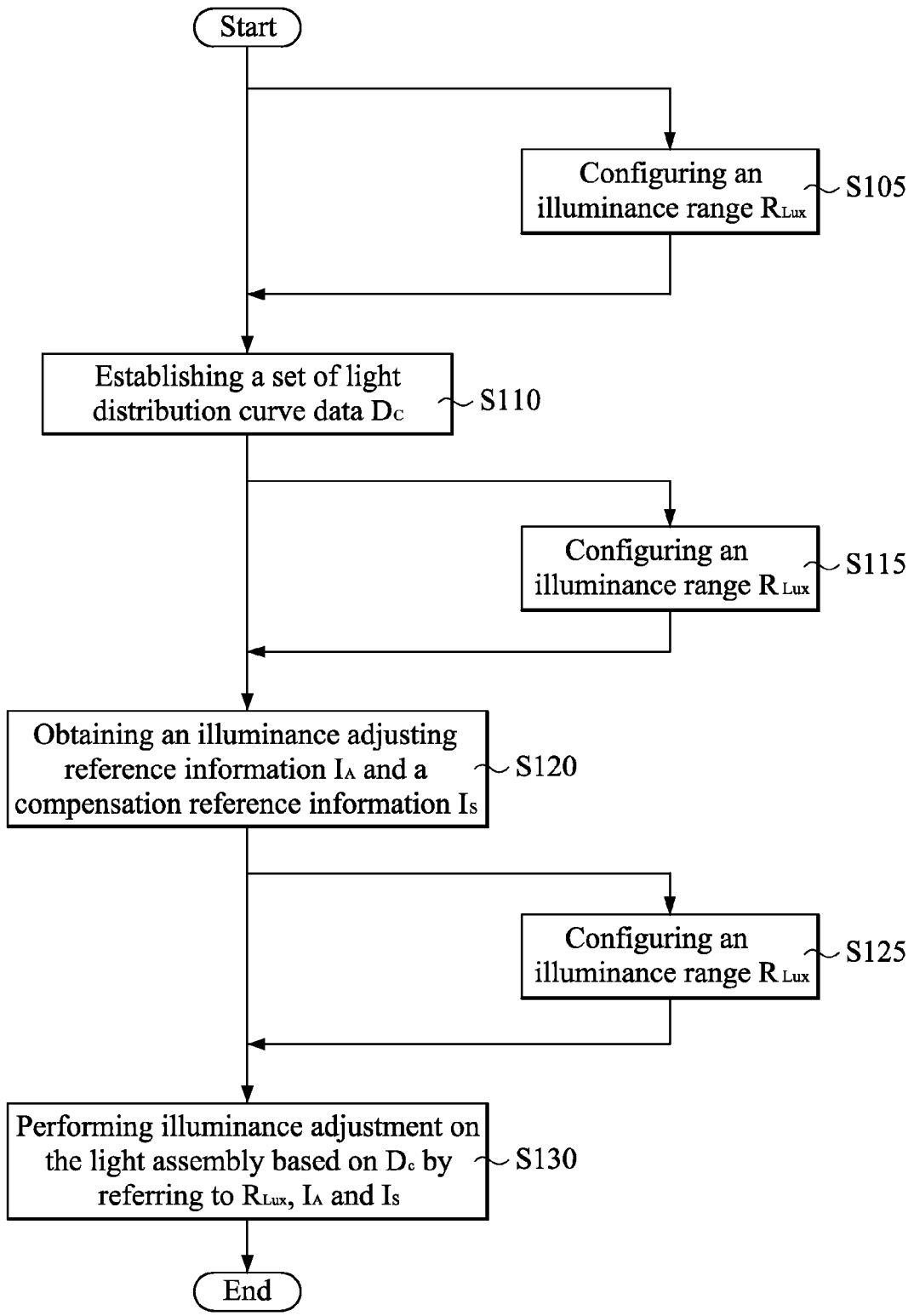
FIG. 2 is a flow chart of the illuminance configuring illumination system according to the embodiment of the present invention.

Please refer to FIG. 2, the following description explains the illuminance configuring illumination method adopted by the illuminance configuring illumination system of the present invention with reference to FIG. 1.

First, a set of light distribution curve data $D_C$ (step S110) is established. The set of preset light distribution curve data $D_C$ usually can be measured and obtained before roll-out. The set of preset light distribution curve data $D_C$ can be established in the control module 2 in the form of table look-up, equation, etc. Furthermore, the set of preset light distribution curve data $D_C$ can only include a light distribution data in one or more light distribution direction (for example, 0°~60°) of the light assembly 1, and is not necessary to include a set of light distribution data with all light distribution directions (0°~360°).

Next, via a distance measuring module 3, a light distance from the light assembly 1 to a reference object O, which is located in a preset light distribution direction and illuminated by the light assembly 1, is measured thereby obtaining an illuminance adjusting reference information $I_A$. Via illuminance measuring module 4, the environmental illuminance variation existing in the surroundings of the light assembly is detected, thereby obtaining a compensation reference information Is (step S120). The illuminance adjustment reference information $I_A$ and the compensation reference information Is can be measured and detected simultaneously or in any arbitrary order. The present invention is not limited to this.

Preferably, under the circumstances that there are a plurality of light assemblies 1, and in order to avoid mutual interruption between each detector (especially the light detector of the illuminance measuring module 4) to perform the detection uniformly, the measurement of the light distance and/or the detection of the environmental illuminance variation performed by the control module 2 of the light assembly 1 are operated synchronously by following the same alternating current power cycle of a common alternating current circuit. Thus, the measurement/detection/adjustment are operated synchronously. More specifically, under the circumstances that all the light assemblies 1 are electrically powered by one common alternating current power circuit (for example, a city electric supply), the control modules 2 in each light assembly 1 intercept a full cycle of the city electric alternating current power supply (1/frequency) according to which the adjustment rate of the control modules 2 are modulated to a same rate. Thus, the measurement of the light distance and/or the detection of the environmental illuminance variation are performed synchronously. It is noted that, the synchronous performance mentioned above also includes turning off and on the light assemblies 1 within a short time period synchronously.

Next, the control module 2 performs illuminance adjustment on the light assembly 1 based on the set of preset light distribution curve data $D_C$ by referring to the configured illuminance range $R_{Lux}$, the illuminance adjustment reference information $I_A$ and the compensation reference information $I_S$ (step S130). More specifically, based on the set of preset light distribution curve data $D_C$, the illuminance adjustment reference information $I_A$ and the determined illuminance range $R_{Lux}$, the control module 2 can look up and substitute the information into functions, and then obtain or compute the brightness and illuminance needed. For example, the demanded illuminance=$f(D_C, I_A, R_{Lux})$. The above outcome is coordinated with the brightness and illuminance of current environmental light, and the actual demanded output brightness and illuminance are obtained, by which the illuminance adjustment is performed accurately. For example, output illuminance=demanded illuminance $f(D_C, I_A, R_{Lux})$–environmental illuminance $f(I_S)$.

The illuminance range $R_{Lux}$ can be configured at any time point. For instance, the illuminance range $R_{Lux}$ can be configured before the establishment of the set of light distribution curve data $D_C$ (step S105) and is used as the default value. The illuminance range $R_{Lux}$ can also be configured before obtaining the illuminance adjustment reference information $I_A$ and the compensation reference information $I_S$ (step S115), or before performing the illuminance adjustment (step S125), or during the performance of illuminance adjustment.

Besides, due to environmental changes and operations made by people, the illuminance adjustment reference information $I_A$ and the compensation reference information $I_S$ and the determined illuminance range $R_{Lux}$ can vary anytime, and the control module 2 will then perform illuminance adjustment on the light assembly 1 according to these variations. Preferably, to avoid any negative effects caused by frequent illuminance adjustment, the control module 2 can be configured to perform the illuminance adjustment only when there exists alterations in one or more of the illuminance adjustment reference information $I_A$, the compensation reference information Is and the determined illuminance range $R_{Lux}$, or when there exists alterations that exceed a present range of alteration. Furthermore, to avoid an uncomfortable vision experience caused from dramatic illuminance adjustment, the control module 2 can be configured to gradually perform illuminance adjustment on the light assembly 1 according to the determined illuminance range $R_{Lux}$, the illuminance adjustment reference information $I_A$ and the compensation reference information $I_S$.

Moreover, the control module 2 can also perform the configuration of the illuminance range on all the light assemblies 1 synchronously by following the same alternating current power cycle of a common alternating current circuit, according to the switching operation on the power switch of the alternating current circuit, the controlling operation on the remote controller, or other types of operation. For instance, when a user switches the power switch to turn on all the light assemblies 1, the control modules 2 of each light assembly 1 synchronously adjusts the illuminance on all light assemblies 1 to an illuminance value that falls within the determined illuminance range $R_{Lux}$ according to the operation of turning on the light on the power switch (the time point and/or the number of times of the operation). Also, the adjustment rate of all the light assemblies 1 are synchronous based on the alternating current power cycle.

By the illuminance configuring illumination system and method provided by the present invention, the present invention can achieve precise illuminance adjustment to adjust illuminance to a determined or selected illuminance value without utilizing specialized detecting meters, and thus provides convenient and accurate illuminance adjustment. Moreover, the present invention can perform modifications when the position of a light assembly is changed, and can perform illuminance compensating according to the environmental illuminance variations, maintaining accurate illuminance, and enabling convenient use and configuration of light assemblies.

The above description is only an explanation of the preferred embodiments of the present invention. A person with ordinary skill in the art can make various improvements according to the above description. However, those modifications shall still fall within the scope of the patent protection of the present invention defined as follows.

What is claimed is:

1. An illuminance configuring illumination system for adjusting light, comprising:
    a light assembly with an illuminance range;
    a control module provided with a set of preset light distribution curve data which is a set of luminous intensity distribution data in relation to a light distribution direction and a control light distance of the light assembly;
    a distance measuring module correspondingly measuring a measured light distance from the light assembly to a reference object located in a preset light distribution direction and illuminated by the light assembly, and obtaining an illuminance adjusting reference information; and
    an illuminance measuring module detecting an environmental illuminance variation existing in surroundings of the light assembly, without a light output of the light assembly, and obtaining a compensation reference information,
    wherein the control module performs an illuminance adjustment on the light assembly based on the set of preset light distribution curve data by referring to the illuminance range, the illuminance adjusting reference information and the compensation reference information.

2. The illuminance configuring illumination system as claimed in claim 1, wherein the illuminance measuring module includes a light detector correspondingly detecting the environmental illuminance variation in a non-light-distribution direction of the light assembly.

3. The illuminance configuring illumination system as claimed in claim 1, wherein the illuminance measuring module includes a plurality of light detectors correspondingly detecting the environmental illuminance variations existing in a plurality of directions including a non-light-distribution direction and the light distribution direction.

4. The illuminance configuring illumination system as claimed in claim 1, further comprising a setting module coupled with the control module for a user to configure the illuminance range.

5. The illuminance configuring illumination system as claimed in claim 4, wherein the light assembly comprises multiple light assemblies each with the illuminance range; and wherein the setting module includes a power switch coupled with the control module through an alternating current power circuit, with the setting module configuring the illuminance range synchronously by following a same alternating current power cycle of the alternating current power circuit.

6. The illuminance configuring illumination system as claimed in claim 5, with the illuminance measuring module configured to detect the environmental illuminance variation when the light assembly is turned off and on within a time period that cannot be perceived by a human eye.

7. The illuminance configuring illumination system as claimed in claim 1, wherein the illuminance measuring module includes a light sensor element and a light collector element disposed corresponding to the light sensor element, and wherein the light sensor element correspondingly detects the environmental illuminance variation existing in surroundings of the light assembly through the light collector element.

8. The illuminance configuring illumination system as claimed in claim 1, with the illuminance measuring module configured to detect the environmental illuminance variation when the light assembly is turned off and on within a time period that cannot be perceived by a human eye.

9. An illuminance configuring illumination method for adjusting light, comprising:
 providing a light assembly with an illuminance range;
 measuring and obtaining a set of light distribution curve data as a set of luminous intensity distribution data in relation to a light distribution direction of the light assembly and a control light distance of the light assembly;
 measuring a measured light distance from the light assembly to a reference object located in a preset light distribution direction and illuminated by the light assembly, and obtaining an illuminance adjusting reference information;
 detecting an environmental illuminance variation existing in surroundings of the light assembly, without a light output of the light assembly, and obtaining a compensation reference information; and
 performing an illuminance adjustment on the light assembly based on the set of light distribution curve data by referring to the illuminance range, the illuminance adjusting reference information and the compensation reference information.

10. The illuminance configuring illumination method as claimed in claim 9, wherein detecting comprises detecting the environmental illuminance variation existing in the surroundings of the light assembly within a preset short time period during which the light assembly is turned off and after which the light assembly is turned on, wherein the preset short time period cannot be perceived by a human eye.

11. The illuminance configuring illumination method as claimed in claim 9, wherein performing comprises compensating and adjusting illuminance on the light assembly when an alteration exists in connection to the illuminance range, the illuminance adjusting reference information, and the compensation reference information or when the alteration exists that exceed a preset range of alterations.

12. The illuminance configuring illumination method as claimed in claim 9, wherein performing comprises gradually adjusting illuminance on the light assembly according to an extent of the alteration.

13. The illuminance configuring illumination method as claimed in claim 9, further comprising configuring the illuminance range.

14. The illuminance configuring illumination method as claimed in claim 13, wherein providing the light assembly comprises providing multiple light assemblies each having the illuminance range; and wherein configuring the illuminance range is synchronously performed by following a same alternating current power cycle of an alternating current circuit.

15. The illuminance configuring illumination method as claimed in claim 9, wherein providing the light assembly comprises providing multiple light assemblies each having the illuminance range; and wherein measuring and detecting are performed synchronously by following a same alternating current power cycle of an alternating current circuit.

16. The illuminance configuring illumination method as claimed in claim 9, wherein detecting is under a condition that the light assembly is turned on, and wherein performing is performed when the light assembly is turned on.

* * * * *